United States Patent [19]

Scheunemann et al.

[11] Patent Number: 5,733,663
[45] Date of Patent: Mar. 31, 1998

[54] COMPOSITE MEMBRANE AND PROCESS FOR ITS PRODUCTION

[75] Inventors: Ude Scheunemann, Liederbach; Olaf Althoff, Niedernhausen; Werner Hickel, Ludwigshafen; Gunther Appel, Hattersheim; Jacqueline Bauer, Oberursel; Gerhard Geiss, Liederbach, all of Germany

[73] Assignee: Hoechst Aktiengesellschaft, Frankfurt, Germany

[21] Appl. No.: 910,467

[22] Filed: Jul. 25, 1997

Related U.S. Application Data

[63] Continuation of Ser. No. 435,471, May 5, 1995, abandoned.

[30] Foreign Application Priority Data

May 9, 1994 [DE] Germany .................. 44 16 330.4

[51] Int. Cl.$^6$ ............... B32B 9/04; B29C 65/00; B01D 29/00
[52] U.S. Cl. ............... 428/447; 264/298; 264/216; 264/204; 264/207; 264/41; 210/490; 210/500 M
[58] Field of Search ............... 428/447; 264/298, 264/216, 204, 207, 41; 210/490, 500 M

[56] References Cited

U.S. PATENT DOCUMENTS

| 3,445,321 | 5/1969 | Flynn . |
| 3,892,665 | 7/1975 | Steigelmann et al. . |
| 4,279,855 | 7/1981 | Ward, III . |
| 4,631,075 | 12/1986 | Yamabe et al. . |
| 5,286,280 | 2/1994 | Chiou . |

FOREIGN PATENT DOCUMENTS

| 0107636 | 5/1984 | European Pat. Off. . |
| 0134056 | 3/1985 | European Pat. Off. . |
| 0220753 | 5/1987 | European Pat. Off. . |
| 1564281 | 4/1969 | France . |
| 34 15 624 A1 | 10/1984 | Germany . |
| 34 15 624 | 2/1994 | Germany . |

OTHER PUBLICATIONS

Derwent Publications Ltd., London, GB, Abstract No. 87–019258.
Patent Abstracts of Japan, Abstract No. JP61278307 published Dec. 9, 1986.
Patent Abstracts of Japan, Abstract No. JP63278525 published Nov. 16, 1988.
Patent Abstracts of Japan, Abstract No. JP5317666 published Dec. 3, 1993.
Derwent Publications Ltd., London, GB, Abstract No. 94–011229.
Chemical Abstracts, vol. 106, 1987, p. 117, Abstract No. 215974.

*Primary Examiner*—Karen A. Dean
*Attorney, Agent, or Firm*—Frommer Lawrence & Haug LLP

[57] ABSTRACT

To produce a composite membrane, the solution of a polymer in a volatile organic solvent is spread on water, the solvent is allowed to evaporate, the polymer is crosslinked and the polymer film formed is transferred to a porous support membrane. The polymer is preferably a polysiloxane which is cross-linked via polymer-bonded OH groups. The composite membrane is suitable, inter alia, for pervaporation.

12 Claims, No Drawings

COMPOSITE MEMBRANE AND PROCESS FOR ITS PRODUCTION

This application is a continuation of application Ser. No. 08/435,471, filed May 5, 1995, now abandoned.

The invention relates to a composite membrane comprising a porous support layer and a crosslinked poller layer applied thereto and also a process for its production and its use.

Processes for separating multimaterial systems by means of membranes have gained in importance in recent years. This also applies to nonporous membranes in which mass transfer is effected by a difference in chemical potential between feed and permeate space. Nonporous membranes are used in many technical fields such as, for example, dialysis, reversed osmosis, pervaporation, vapor permeation or gas separation. Membranes for gas separation are used, for example, for the oxygen enrichment of air, for separating methane and carbon dioxide or for nitrogen enrichment from air.

Membranes having a high permeability and high selectivity are desirable. A problem in principle is that permeability and selectivity frequently go in opposite directions. The selectivity is a material property, while the permeability of the membrane is determined by the permeation coefficient and the thickness. Materials having a high selectivity have only low permeation coefficients, others have high permeation coefficients with low selectivity. Frequently, one selects a material having good selectivity and attempts to produce as thin as possible a membrane layer. This thin membrane layer is applied to a porous support membrane or to a porous support membrane with a highly permeable intermediate layer.

Thus, for example, Japan Tokkyo Koho. JP 63240917 describes a two-layer composite membrane for gas separation, which membrane comprises a porous support membrane (A) of a polysulfone and a selective, thin cover layer (C) of a copolymer of tetrafluoroethylene and a silane containing vinyl groups.

To achieve a sufficiently high permeability, it is usual to apply this cover layer so that it is ultrathin. However, such an ultrathin layer can only rarely be applied without defects to a porous support. A further disadvantage of such a layer buildup is that the effective area of the selective layer is restricted to the proportion by area of the pores in the porous support membrane and the permeability is thus low.

The situation is different if a nonporous intermediate layer of a material of high permeability is additionally used. On the one hand, very thin films can be produced thereon, on the other hand the effective hole area can be increased by the action of the intermediate layer as gutter layer and the permeability of the composite membrane thus rises. DE-A 34 15 624 describes such a composite membrane for gas separation which has a three-layer structure. In detail, it comprises a porous support material (A), a highly permeable intermediate layer (B) and a selective cover layer (C) applied thereto. The layer (B) can be, inter alia, a highly permeable crosslinked or uncrosslinked polyorganosiloxane layer. The polysiloxane layer can be produced by dissolving the polysiloxane in an organic solvent and directly applying the diluted solution obtained to the porous support membrane and drying the solution.

This variant has the disadvantage that in the application of the liquid to the porous support the liquid runs into the pores and thus the permeability of the membrane is greatly reduced. According to a second variant described, the solution is spread on the surface of water to produce a thin layer of polysiloxane which is applied to the porous support membrane. According to observations of the applicant, the layer material running into the pores is not ruled out in this variant, if the layer has not been crosslinked.

The crosslinking customarily takes place in the membrane joined to the support material. According to JA 83-092430, the crosslinking is carried out by heating the polysiloxane membrane on the support.

A possible way of producing the layer is the water casting process, which is described, for example, in U.S. Pat. No. 4,279,855. A solution of the layer material is here spread on a water surface. After evaporation of the solvent, an ultrathin solid film is formed, which film can be laminated onto the porous support membrane. However, films which become solid only as a result of the evaporation of the solvent are frequently, owing to the necessary solubility of the film-forming material, insufficiently solvent-stable even after drying, which can cause problems both in the application of a further layer and also in the later use of the membrane.

It is therefore an object of the invention to find a process which allows the production of pore-free layers having high gas permeability and high resistance to solvents.

These requirements can be met using the present invention. A process has now been found for producing a composite membrane, which comprises spreading the solution of a polymer in a volatile organic solvent on water, allowing the solvent to evaporate, crosslinking the polymer and transferring the polymer film formed to a support membrane.

In this process, the pores of the porous support are not blocked and, on the other hand, the layer is in crosslinked form after application and is thus sufficiently solvent-stable.

Furthermore, it is possible to apply the polymer layer crosslinked on the water surface as a uniform cover layer to an impermeable membrane, so that it can serve as protective layer for the underlying surface layer and protects it from, for example, mechanical damage. The advantage here is that the application of the cover layer is carried out without organic solvents, by means of which damage to the underlying layer by partial dissolution is prevented.

Polymers which can be crosslinked are, for example, polycondensates such as polyamides containing olefinic double bonds, for example in the form of acrylate or vinyl groups, and can therefore be crosslinked by high-energy radiation. Crosslinkable polymers also include polymers which still contain hydroxyl groups and therefore react with polyisocyanates, melamine resins and polyepoxides.

As crosslinking reaction for polyorganosiloxanes, hydrosilylation is frequently used (Encyclopedia of Polymer Science and Technol., Vol. 15, John Wiley (1984)). However, the Pt catalyst required for this purpose is very sensitive to moisture, so that this reaction cannot be combined with the water casting process.

The polymer to be crosslinked is preferably a polysiloxane. It is particularly preferred for the polysiloxane to contain hydroxyl groups and be crosslinked via polymer-bonded OH groups. The process used for the spreading on the water surface is preferably the water casting process.

It is essential to the process of the invention that a reaction solution of polyorganosiloxane can be spread on a water surface and after spreading and evaporation of the solvent the film on the water surface becomes sufficiently strong as a result of a crosslinking reaction. It can thus be laminated onto a porous support membrane without a liquid film material running into the pores of the support membrane and blocking them.

Further polymers which can be used are hydroxyl-containing polymers which can be crosslinked by difunctional or multifunctional isocyanates or melamines. Crosslinkable, fluorine-containing copolymers are described, for example, in the European Patent Application 0 276 649. Furthermore, polymers containing double bonds can be crosslinked by means of free radicals. The crosslinking can here be triggered by initiators or UV light.

One possibility is, for example, the crosslinking by UV light of a polyorganosiloxane containing olefinic double bonds, e.g. in the form of acrylate or methacrylate groups. The reaction proceeds by a free-radical mechanism. A sufficiently fast crosslinking reaction can be achieved by blanketing the film with inert gas so as to exclude oxygen. The layers crosslinked on the water can subsequently be transferred to the support membrane and have good gas permeability.

Surprisingly, it has also been found that a polyorganosiloxane bearing OH groups can also be crosslinked by means of a condensation reaction. For this purpose, the Solution of the polyorganosiloxane and a crosslinker in a volatile organic solvent is spread on the water surface of a coating trough. After evaporation of the solvent, there remains on the water surface an ultrathin defect-free film which, as a result of the condensation crosslinking occurring, becomes sufficiently strong for it to be able to be transferred to the porous support membrane by known methods.

The principle of condensation crosslinking of polyorganosiloxanes having polymer-bonded OH groups is described, for example, in Encyclopedia of Polymer Science and Engineering, Volume 15, Section "Silicones", John Wiley, 1989.

Suitable polyorganosiloxanes having OH groups are, for example, polydimethylsiloxanes, polydiethylsiloxane, polydimethyldiphenylsiloxane copolymer, polyorganohydrosiloxane, polyfluoroalkylsiloxane or polyvinylmethylsiloxane having terminal OH groups. To make "crosslinking" possible, the polyorganosiloxanes should contain at least two hydroxyl groups in the molecule.

Crosslinkers which can be used are silanes containing acetoxy, alkoxy or enoxy groups. It is also possible to use silanes containing amino groups. Furthermore, mixtures of crosslinkers are also usable. Particularly suitable is crosslinking using an acetoxysilane, in particular triacetoxysilane.

There are numerous catalysts for initiating and accelerating the reaction, in particular organic amines, organic metal salts, preferably organic tin salts. Preference is given to using dibutyltin dilaurate. The solvents used should be compatible with the reaction mixture and show a good spreading behavior. Well suited solvents are, for example, alkyl acetates such as butyl acetate. However, it is also possible to use mixtures of solvents. The solvent mixture can also usefully contain additives, for example for improving adhesion or for increasing the mechanical strength, such as $SiO_2$ particles or specific surface-active organic silicon compounds (e.g. phenylmethylpolysiloxane or glycidoxypropyltriethoxysilane). This increases the adhesion to a subsequently applied permeation-selective layer.

It may be advantageous to allow a certain period of time, e.g. 10 minutes, to elapse between making up the mixture and spreading the reaction solution on the water. However, complete crosslinking prior to spreading should not occur, because otherwise film formation is no longer possible. It is also possible to spread the solution on the water directly after combining the components.

Porous support membranes are commercially available. They can comprise, for example, polysulfone, polypropylene, polyethylene, polyamide, polyimide, polyester, polyacrylonitrile or other polymers. Their pore size is between 2 and 5000 nm, preferably between 5 and 250 nm. The porous membrane can here be symmetric or asymmetric. Its permeability to oxygen should be greater than 2 $m^3$ (STP)/$m^2$·h·bar.

As subphase, use can be made of water of a wide variety of qualities; demineralized water or even normal mains water can be used. It is also possible to add various additives such as, for example, salts or additives for lowering the freezing point. The water temperature can here be between $-10°$ and $+60°$ C., preferably from $20°$ to $50°$ C. The time between spreading the solution and transferring the film to the support can be between 2 seconds and 5 minutes. The film can be transferred to the porous support after only a short residence time on the water (i.e. the film is only partially crosslinked), with the film crosslinking further on the support. However, it is also possible to wait until the film is completely crosslinked and only then apply it to the support membrane. The membrane can be subsequently dried, for example at from $20°$ to $160°$ C. for from 2 minutes to 5 hours, preferably at from $40°$ to $70°$ C. for from 1 to 30 minutes.

This process can be used to coat a wide variety of support materials and shapes. Both planar membranes and hollow-fiber membranes having single layers or even multiple layers on top of one another can be coated. The water casting process can be used for batchwise coating or for continuous coating in which, for example, roll material of flat or hollow-fiber membranes is coated and the coating material is continuously resupplied.

The composite membrane thus obtained comprises a porous support membrane on which there is arranged a crosslinked permeation-selective polymer layer, in particular a crosslinked polysiloxane layer. In particular, the crosslinked polysiloxane layer comprises units of the formula (I), (II) or (III)

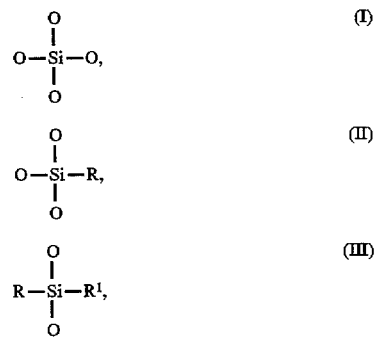

where R and $R^1$ are each, independently of one another, an alkyl group (in particular having from 1 to 3 carbon atoms), a phenyl group or a vinyl group.

The composite membrane of the invention can also be used as support for a further permeation-selective layer. In this case, in particular the crosslinked polymer layer, preferably the crosslinked polysiloxane layer, is enclosed by the support membrane and the applied permeation-selective layer. The crosslinked polymer layer, in particular the crosslinked polysiloxane layer, here serves as gutter layer for improving the total permeability and as a smooth, defect-free substrate for a further permeation-selective layer.

The membrane thus obtained can have, in particular, a total layer thickness of between 10 and 5000 nm. It usually has a permeability to oxygen of from 0.1 to 4 $m^3$ (STP)/$m^2$·h·bar and an oxygen/nitrogen selectivity of from 1.9 to 3. It is resistant to solvents (such as alcohols) and can thus be used in a solvent-containing atmosphere and for pervaporation.

The invention is illustrated by the examples.

EXAMPLE 1

0.3 ml of a 50% strength methyltriacetoxysilane solution in butyl acetate and 0.1 ml of a 5% strength dibutyltin dilaurate solution in butyl acetate are added to a solution of 1 ml of polydimethylsiloxane (having 2 terminal Si-OH groups) and 5 ml of butyl acetate. 50 µl of this solution are spread on a water surface (300 cm$^2$). After 1 minute at a water temperature of 40° C., the film crosslinks and becomes viscoelastic on the water surface. It is subsequently transferred to a support (®Celgard 2400) and dried at 50° C. for 30 minutes in a drying oven. The subsequent permeability measurement and determination of the separation factor gives an oxygen permeability of from 2 to 4 m$^3$ (STP)/m$^2$h•bar and a separation factor of from 1.9 to 2.1 with respect to nitrogen.

EXAMPLE 2

0.3 ml of a 50% strength methyltriacetoxysilane solution in butyl acetate and 0.1 ml of a 5% strength dibutyltin dilaurate solution in butyl acetate are added to a solution of i ml of OH-terminated polydimethyldiphenylsiloxane copolymer and 5 ml of butyl acetate. 50 µl of this solution are spread on a water surface (300 cm$^2$). After 40 seconds at a water temperature of 40° C., the film crosslinks and becomes viscoelastic on the water surface. It is subsequently transferred to a support (®Celgard 2400) and dried at 70° C. for 15 minutes in a drying oven. The subsequent permeability measurement and determination of the separation factor gives an oxygen permeability of from 0.5 to 1 m$^3$ (STP)/m$^2$h•bar and a separation factor of from 2.4 to 2.6 with respect to nitrogen.

EXAMPLE 3

0.7 ml of a 10% strength phenylmethylsilicone resin solution in butyl acetate, 0.3 ml of a 50% strength methyltriacetoxysilane solution in butyl acetate and 0.1 ml of a 5% strength dibutyltin dilaurate solution in butyl acetate are added to a solution of 1 ml of OH-terminated polydimethylsiloxane and 5 ml of butyl acetate. 50 µl of this solution are spread on a water surface (300 cm$^2$). After 2 minutes at room temperature (22° C.), the film crosslinks and becomes viscoelastic on the water surface. It is subsequently transferred to a support (®Celgard 2400). The subsequent permeability measurement and determination of the separation factor gives an oxygen permeability of from 2 to 4 m$^3$ (STP)/m$^2$h•bar and a separation factor of from 1.9 to 2.3 with respect to nitrogen.

EXAMPLE 4

0.3 ml of a 50% strength methyltriacetoxysilane solution in butyl acetate, 0.03 ml of a 10% strength glycidoxypropyltriethoxysilane solution in butyl acetate and 0.1 ml of a 5% strength dibutyltin dilaurate solution in butyl acetate are added to a solution of 1 ml of OH-terminated polydimethylsiloxane and 5 ml of butyl acetate. 200 µl of this solution are spread on a water surface (300 cm$^2$). After 1 minute at a water temperature of 40° C., the film crosslinks and becomes viscoelastic on the water surface. It is subsequently transferred to a support (®Celgard 2400) and dried at 50° C. for 30 minutes in a drying oven. The subsequent permeability measurement and determination of the separation factor gives an oxygen permeability of from 0.5 to 1 m$^3$ (STP)/m$^2$h•bar and a separation factor of from 1.9 to 2.3 with respect to nitrogen.

EXAMPLE 5

0.3 ml of a 50% strength methyltriacetoxysilane solution in butyl acetate and 0.1 ml of a 5% strength dibutyltin dilaurate solution in butyl acetate are added to a solution of 1 ml of OH-terminated polydimethylsiloxane and 5 ml of butyl acetate. 50 µl of this solution are spread on a water surface (300 cm$^2$). After 1 minute at a water temperature of 40° C., the film crosslinks and becomes viscoelastic on the water surface. It is subsequently transferred to a support (®Celgard 2400) and dried at 50° C. for 30 minutes in a drying oven. In a subsequent coating step, the membrane is coated with a soluble, partially fluorinated polyimide of 2,2-bis(3,4-dicarboxyphenyl)hexafluoropropanoic dianhydride and 2,2-bis(3-aminophenyl)hexafluoropropane (P. E. Cassidy et al., J. Macromolec. Sci. Rev. Macromol. Chem. Phys, C29, 365 (1989), compound XXXIV).

For this purpose, a solution of 50 mg of this polyimide in 1 ml of chlorobenzene and 4 ml of dichloromethane is prepared. 50 µl of this solution are spread on a water surface (300 cm$^2$) at a temperature of 30° C. (water casting process). After evaporation of the solvent, the film is transferred to the membrane and dried at 40° C. for 30 minutes in a drying oven. The subsequent permeability measurement and determination of the separation factor of this composite membrane gives an oxygen permeability of from 0.1 to 0.2 m$^3$ (STP)/m$^2$h•bar and a separation factor of from 5.5 to 6.0 with respect to nitrogen.

EXAMPLE 6

0.05 ml of ethylbenzoin are added to a solution of 1 ml of (acryloxypropyl)methylsiloxane copolymer (proportion of acryloxypropyl from 15 to 20%) and i ml of butyl acetate. 300 µl of this solution are spread on a water surface (300 cm$^2$). The film is blanketed with nitrogen. The film is irradiated on the water surface by means of an Hg high-pressure lamp and crosslinked. It is subsequently transferred to a support (®Celgard 2400). The subsequent permeability measurement and determination of the separation factor of the membrane gives an oxygen permeability of from 0.5 to 1 m$^3$ (STP)/m$^2$h•bar and a separation factor of from 1.9 to 2.1 with respect to nitrogen.

EXAMPLE 7

0.3 ml of a 50% strength methyltriacetoxysilane solution in butyl acetate and 0.1 ml of a 5% strength dibutyltin dilaurate solution in butyl acetate are added to a solution of 1 ml of OH-terminated polydimethylsiloxane and 5 ml of butyl acetate. 50 µl of this solution are spread on a water surface. After 1 minute at a water temperature of 30° C., the film becomes viscoelastic on the water surface. It is subsequently transferred to a support (®Celgard 2400). In a subsequent coating step, the membrane is coated with a soluble, partially fluorinated polyimide of 2,2-bis(3,4-dicarboxyphenyl)hexafluoropropanoic dianhydride and 2,2-bis(3-aminophenyl)hexafluoropropane (P. E. Cassidy et al., J. Macromolec. Sci. Rev. Macromol. Chem. Phys, C29, 365 (1989), compound XXXIV). For this purpose, a solution of 50 mg of this polyimide in 1 ml of chlorobenzene and 4 ml of dichloromethane is prepared. 50 µl of this solution are spread on a water surface (300 cm$^2$) at a temperature of 30° C. After evaporation of the solvent, the film is transferred to the membrane. In a further coating step, 0.3 ml of 50% strength methyltriacetoxysilane solution in butyl acetate and 0.1 ml of a 5% strength dibutyltin dilaurate solution in butyl acetate are added to a solution of 1 ml of OH-terminated polydimethylsiloxane and 5 ml of butyl acetate. 200 µl of this solution are spread on a water surface. After 1 minute, the film is transferred to the membrane and dried at 50° C. for 30 minutes in a drying oven. The subsequent permeability measurement and determination of the separation factor of this composite membrane gives an oxygen permeability of from 0.1 to 0.2 m³ (STP)/m²h·bar and a separation factor of from to 6.0 with respect to nitrogen.

We claim:

1. A process for producing a composite membrane which membrane has a total layer thickness from about 0.01 to 5 μm, and which has a permeability to oxygen which ranges from about 0.1 to 4 m³ (STP)/m²h bar, which process comprises spreading a solution of polysiloxane polymer in a volatile organic solvent on water, allowing the solvent to evaporate, crosslinking the polysiloxane polymer having polymer-bonded OH groups via a crosslinker, and transferring the polymer film formed to a support membrane.

2. The process as claimed in claim 1, wherein the crosslinker used is a bifunctional, trifunctional or tetrafunctional silane having hydrolysable SiO bonds.

3. The process as claimed in claim 2, wherein the crosslinker used is triacetoxymethylsilane.

4. The process as claimed in claim 1, wherein crosslinking is carried out in the presence of a catalyst.

5. The process as claimed in claim 4, wherein the catalyst used is a tin salt.

6. A composite membrane which has a total layer thickness from about 0.0to 5 μm, and which has a permeability to oxygen which ranges from about 0.1 to 4 m³ (STP)/m²h bar, which membrane comprises at least one polysiloxane polymer layer on a porous support membrane, and wherein the polymer layer is crosslinked via polymer-bonded OH groups, and wherein the polymer layer has been transferred from a water surface to the support.

7. A composite membrane as claimed in claim 6, wherein the polymer layer serves as protective layer.

8. A composite membrane as claimed in claim 6, wherein the crosslinked polysiloxane layer comprises units of the formula

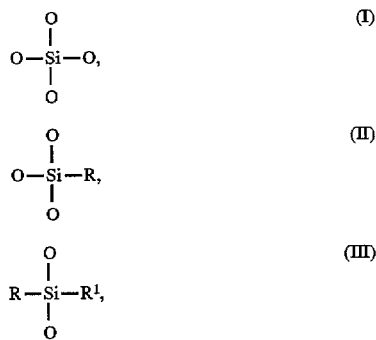

where R and R¹ are each, independently of one another, an alkyl, phenyl or vinyl group.

9. The method of using the composite membrane as claimed in claim 6 for gas separation, pervaporation or vapor permeation.

10. The method of using the composite membrane as claimed in claim 6 as support for a permeation-selective layer.

11. A process for producing a composite membrane which membrane has a total layer thickness from about 0.01 to 5 μm, and which has a permeability to oxygen which ranges from about 0.1 to 4 m³ (STP)/m²h bar, which process comprises spreading a solution of polysiloxane polymer in a volatile organic solvent on water, allowing the solvent to evaporate, crosslinking the polysiloxane polymer having definic double bonds by radiation, and transferring the polymer film formed to a support membrane.

12. A composite membrane which has a total layer thickness from about 0.01 to 5 μm, and which has a permeability to oxygen which ranges from about 0.1 to 4 m³ (STP)/m³h bar, which membrane comprises at least one polysiloxane polymer layer on a porous support membrane, and wherein the polymer layer is crosslinked via olefin double bonds, and wherein the polymer layer has been transferred from a water surface to the support.

* * * * *